United States Patent [19]

Kimerer, Jr.

[11] 4,186,510
[45] Feb. 5, 1980

[54] FLAT-BODIED NYMPH HOOK

[76] Inventor: Neil B. Kimerer, Jr., Linden Hall, Pa. 16801

[21] Appl. No.: 884,555

[22] Filed: Mar. 8, 1978

[51] Int. Cl.² .............................................. A01K 85/08
[52] U.S. Cl. .................................. 43/42.25; 43/42.26; 43/42.37
[58] Field of Search ................. 43/42.25, 42.26, 42.27, 43/42.28, 42.37, 42.53, 42.3

[56] References Cited

U.S. PATENT DOCUMENTS

| | | | |
|---|---|---|---|
| 1,940,604 | 12/1933 | Pflueger | 43/42.37 X |
| 2,309,902 | 2/1943 | Harvey | 43/42.37 X |
| 2,611,985 | 9/1952 | Lloyd | 43/42.37 X |
| 3,395,480 | 8/1968 | McPherson | 43/42.28 X |
| 3,750,322 | 8/1973 | Putnam | 43/42.25 |
| 3,774,335 | 11/1973 | Sisty | 43/42.25 |

*Primary Examiner*—Nicholas P. Godici
*Attorney, Agent, or Firm*—Thomas E. Sterling

[57] ABSTRACT

This invention is a fishing fly lure of a flat-bodied nymph hook comprising a fishing hook; a double-bowed center section attached to the fishing hook and a fishing eye attached to the double-bowed center section. The double-bowed center section is wrapped with fly preparation threaded to form a flat center section of the fishing lure.

9 Claims, 12 Drawing Figures

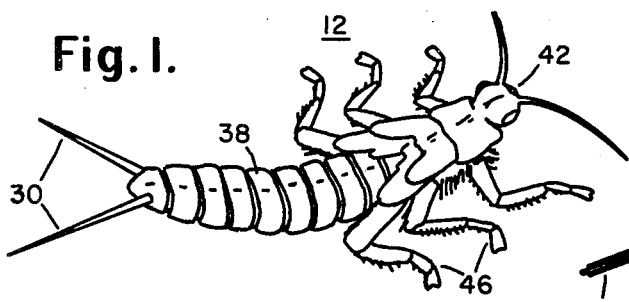
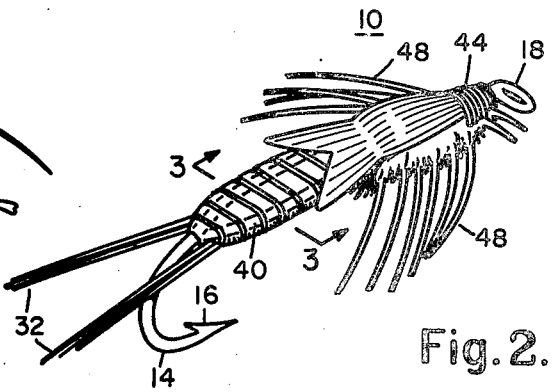
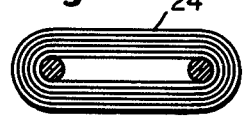
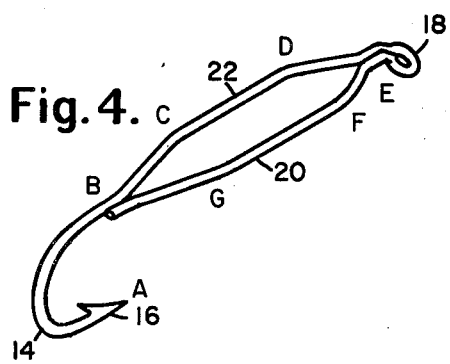
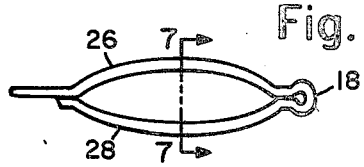
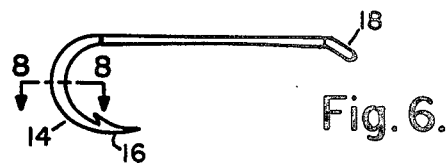
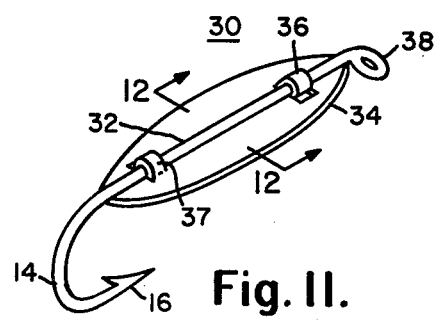
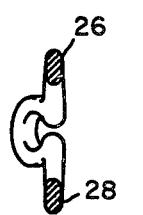
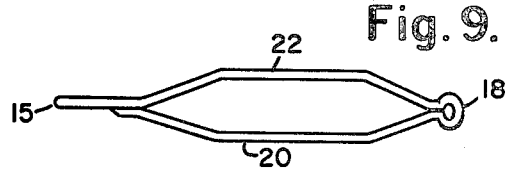
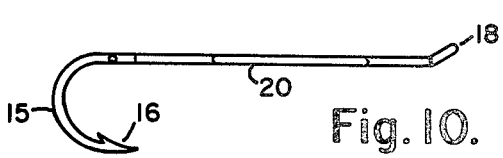
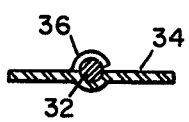

FLAT-BODIED NYMPH HOOK

PRIOR ART STATEMENT

The inventor knows of no prior art close to this invention. The inventor is not withholding any known prior art.

This invention relates to fishing fly lures and in particular to a flat-bodied nymph hook lure and a method of manufacturing the same.

The flat-bodied nymph hook is a fishing hook that gives a flat appearance to a fly when the fly is tied on the hook. The fly will appear wider than it is tall when it is viewed from the front or the rear with the hook point curving down. The insects upon which trout and other fishes feed do not have round bodies but are instead flat. When bodies are tied on conventional hooks to make a fly, the bodies of these flies are round. The flies tied on conventional hooks do not, therefore, accurately imitate the real insect.

To achieve a flat appearance on a conventional hook, a round-bodied fly is soaked in lacquer. When the lacquer reached the proper consistency it was squeezed flat with a pair of pliers. The flat appearance was achieved. However, the materials became very rigid as a result of the lacquer treatment and no longer appeared soft and flexible as the natural insect did. Another existing construction to imitate the nymph is accomplished by tying two brass pins in at the eye of the hook and again at the bend of the hook causing them to bow oppositely from one another to either side of the hook. The fly was then tied onto the bow made by the pins. This procedure gave a flat and soft appearance to the fly but it is very difficult to adequately secure the pins to the hook. It only works for the larger hooks because pins of the appropriate size are not commonly available for the smaller hooks.

The flat-bodied nymph hook overcomes these difficulties by supplying a secure, wide platform integral to the hook upon which to tie the fly. The flat-bodied nymph hook consists of a single wire starting at the point (A) with a conventional hook barb and then curving upwards to point (B) in the fashion of a conventional hook. At point (B) the wire is bent outward into a bow until point (C) where it is bent so it will parallel what would be a normal hook shank. At point (D) the wire is bent inward toward what would be the normal hook shank. At point (F) the wire is bent into a small circle to form the eye of the hook to which the fishing line would be fastened. At point (E) the wire is bent away from what would be the shaft of a normal hook and in the opposite direction from the bend of the wire at the other side of the hook eye just described. The wire is then bent so it would parallel what would be the shank of a normal hook at point (F) which is opposite the bend made at point (D). The wire is bent toward what would be the shank of a normal hook at point (G) opposite the bend made at point (C) until the wire reaches point (B) where it is bent to run along beside the existing wire for a short distance at which point the wire ends. The form of the hook is then wrapped with the fly thread in the conventional manner to produce a fishing lure resembling a live nymph.

The flat-bodied nymph hook can also be constructed by splitting the wire shaft of a standard hook from the beginning of the bend of the hook to the beginning of the eye of the hook and bending the two halves of the split shaft into a similar bow or loop shape as previously described.

The hook can also be made by using a very heavy wire for the shank of a standard hook and pressing or swaging it flat into an oval shape as would be described by the loop in the previous discussions.

An object of this invention therefore is to construct a flat-bodied artificial fly which more accurately presents the appearance of a live flat-bodied nymph.

Another object of this invention is to describe a new method or process of manufacturing a flat-bodied nymph hook.

Still another object of this invention is to describe a new and unique method of tying an artificial fly to more closely resemble a live nymph.

Yet another object of this invention is to set forth a fishing lure having a flat body in the center section thereof.

Still another object of this invention is to describe a fish hook design having a bowed center section.

Yet another object of this invention is to describe a fish hook design having a flat plate center section.

Still another object of this invention is to design a fish hook having a swaged shank and bend.

These and other objects of the invention are more fully set forth in the following drawings in which:

FIG. 1 is a perspective drawing of a live flat-bodied nymph;

FIG. 2 is a perspective view of the flat-bodied nymph hook, the subject of this invention;

FIG. 3 is a cross-sectional view taken along line 3—3 of FIG. 2;

FIG. 4 is a perspective view of a flat-bodied nymph hook having a hexagonal center portion and downwardly disposed hook eye;

FIG. 5 is a top view of a modification of the flat-bodied nymph hook showing the swaged center section thereon;

FIG. 6 is a side view of the hook of FIG. 5 showing a swaged hook section;

FIG. 7 is an enlarged view taken along line 7—7 of FIG. 5;

FIG. 8 is an enlarged view taken along line 8—8 of FIG. 6;

FIG. 9 is a top view of a third modification of this invention having a hexagonal body and upwardly disposed hook eye;

FIG. 10 is a side view of the hook of FIG. 9;

FIG. 11 is a perspective view of a fourth modification of this invention showing a flat plate attached to the hook;

FIG. 12 is a cross-sectional view taken along line 12—12 of FIG. 11.

Referring to the drawings, and in particular to FIG. 1, there is shown a live nymph 12 having a head 42, legs 46, flat center section 38 and tail 30. Referring to FIGS. 2, 3 and 4, flat-bodied nymph hook 10 is constructed to resemble a live flat-bodied nymph 12. The base from which the flat-bodied nymph hook 10 is constructed is comprised of a downwardly disposed hook eye 18 attached to center section or shank wires 20 and 22 which are bowed outwardly from one another to form shanks and which converge at the beginning of hook arc-like curve 14 which is attached to hook point 16.

Center section wires 20 and 22 are bowed outwardly in a horizontal plane so that when they are wrapped with a fly thread 24, they produce a horizontal flat-bodied appearance. Referring now to FIG. 3, fly thread 24 is wrapped about wires 20 and 22 to produce a flat ellipsoid-like body. Tail threads 32 are positioned in the rear portion of the nymph hook and extend outwardly therefrom. Legs 48 are wrapped about the nymph hook to simulate the nymph's natural legs 46. Head 44 is subsequently wire wrapped to imitate the insect's head 42. Downwardly-spaced inclined eye 18 permits the fly to be tied upon a conventional fishing line.

Referring now to FIGS. 5, 6, 7 and 8 there is seen now a modification of this invention in which side wires 26 and 28 representing the center section of the insect, are swaged or flattened in the horizontal place to provide more structural strength. Likewise, hook curve 14 is swaged or flattened in a vertical plane, giving the hook greater structural strength.

Referring now to FIGS. 9 and 10, there is shown another modified form of the invention having upwardly disposed hook eye 18. In this modification, wires 20 and 22 describe a hexagon instead of the arc-like form of shank wires 26 and 28 of FIG. 5. The downwardly disposed hook eye 18 produced a different motion when pulled through the water than does the upwardly disposed hook eye 18. This difference in motion is useful in attracting fish under varying fishing conditions.

Referring to FIGS. 11 and 12, there is shown a modification of the invention comprised of an elongated ellipse-shaped disc 34 attached to the center portion of a conventional fish hook. The disc 34 generally is made to conform to the body shape of a live nymph. The hook is comprised of a downwardly disposed eye 38 attached to center shank 32 integral with curved section 14 and a hook point 16. Segments 34 and 37 of the disc 34 are cut therefrom and bent around center shank 32 to attach shank 32 to disc 34. The disc 34 and shank 32 are then wrapped with fly thread to form the nymph hook lure 10.

The steps in making the flat-bodied nymph hook 10 comprise (1) wrapping fly thread circumferentially around wires 20 and 22, side wires 26 and 28 or disc 34, depending upon which modification of the invention is being processed, in successive wrappings so as to form a flat center section 40. After a number of wrappings have been made, (2) tail 32 comprised of horizontal fibers is wrapped into the flat center section 40 so as to extend horizontally therefrom. Leg segments 48 are placed next upon the center section 40 and wrapped thereon, (3) head 44 is then wrapped around the portion of the hook adjacent to eye 18 thus completing the construction of the flat-bodied nymph hook. As can be seen, center body, or thorax, is now comprised of an essentially flat type body which resembles the center section 38 of the live nymph 12. Thus, as may be seen, the flat-bodied nymph hook 10 more closely resembles the natural live nymph 12 than any of the previous nymph hook flies which have been produced.

I claim:

1. A flat-bodied fishing lure comprising in combination:
    a hook eye;
    a shank element attached to said hook eye and extending therefrom to form a flat plane, said shank element comprising in combination:
        two diverging arms connected to said hook eye,
        two parallel arms connected to said two diverging arms,
        two converging arms connected to said parallel arms, one end portion of said converging arms in contact with one another,
        two parallel contiguous arms connected to said two converging arms,
    said two parallel contiguous arms being adjacent to one another;
    fly thread circumferentially wrapped about said two parallel contiguous arms, integrally connecting said two parallel contiguous arms;
    a curved hook attached to one of said parallel contiguous arms;
    a hook point attached to said hook.

2. The combination as claimed in claim 1 in which the cross-section of said two parallel arms is generally elliptically shaped, the long axis of said ellipse lying in the plane of said shank element.

3. The combination as claimed in claim 2 in which the cross-section of said curved hook is generally elliptically shaped, the long axis of said ellipse lying in the plane of said curved hook.

4. The combination as claimed in claim 3 in which said hook eye is upwardly inclined.

5. The combination as claimed in claim 4 in which said hook eye is downwardly inclined.

6. The combination as claimed in claim 5 in which fly thread is circumferentially wrapped about said shank element to form a flat body resembling that of a live nymph.

7. A flat-bodied fishing lure, comprising in combination:
    a fish hook having a hook eye integrally attached to the end portion thereof, said fish hook comprising in combination:
        a straight shank element connected to said hook eye;
        a curved hook connected to said shank element, the cross section of said curved hook being generally elliptically shaped, the long axis of said elipse lying in the plane of said curved hook;
    a flat disc element having a groove therethrough, said straight shank element of said fish hook positioned in said groove;
    two elongated strip elements cut from said flat disc element adjacent to said straight shank element and bent transferse to the axis of said straight shank element circumferentially about said straight shank element securing said fish hook to said flat disc element.

8. The combination as claimed in claim 7, having fly thread circumferentially wrapped about flat disc and said shank element to form a flat body resembling that of a live nymph.

9. The combination as claimed in claim 8, in which the upper edge of said groove is at the mid-line of said straight shank element.

* * * * *